United States Patent
Ohta (10) Patent No.: US 7,089,044 B2
(45) Date of Patent: Aug. 8, 2006

(54) COLLAPSIBLE RADIO TERMINAL, CONVERSION START METHOD AND CONVERSION START PROGRAM

(75) Inventor: Akinori Ohta, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 229 days.

(21) Appl. No.: 10/451,713

(22) PCT Filed: Jun. 17, 2002

(86) PCT No.: PCT/JP02/06016

§ 371 (c)(1),
(2), (4) Date: Jun. 19, 2003

(87) PCT Pub. No.: WO03/024063

PCT Pub. Date: Mar. 20, 2003

(65) Prior Publication Data

US 2004/0235539 A1   Nov. 25, 2004

(30) Foreign Application Priority Data

Sep. 6, 2001 (JP) ............................. 2001-270467

(51) Int. Cl.
*H04M 1/00* (2006.01)

(52) U.S. Cl. ............................. 455/575.3; 455/575.1; 455/550.1

(58) Field of Classification Search ............ 455/90, 455/575, 526, 556, 566, 421, 575.1, 550.1, 455/575.3; 379/433.01, 433.06
See application file for complete search history.

(56) References Cited

U.S. PATENT DOCUMENTS

| 5,818,924 | A | * | 10/1998 | King et al. ............. 379/433.13 |
| 5,884,185 | A | * | 3/1999 | Kim .......................... 455/566 |
| 6,094,565 | A | | 7/2000 | Alberth et al. |
| 6,167,288 | A | * | 12/2000 | Ishihara ...................... 455/566 |
| 6,381,447 | B1 | * | 4/2002 | Eguchi ...................... 455/90.1 |
| 6,434,371 | B1 | * | 8/2002 | Claxton ..................... 455/90.1 |
| 6,434,404 | B1 | * | 8/2002 | Claxton et al. .......... 455/575.3 |
| 6,678,504 | B1 | * | 1/2004 | Toki ........................ 455/575.3 |
| 2001/0023196 | A1 | * | 9/2001 | Kouyama ................... 455/567 |
| 2001/0049296 | A1 | * | 12/2001 | Lee et al. ................... 455/566 |
| 2002/0019216 | A1 | * | 2/2002 | Horiguchi .................... 455/90 |
| 2002/0032010 | A1 | * | 3/2002 | Okuda et al. ................ 455/90 |

FOREIGN PATENT DOCUMENTS

| EP | 0 661 824 A1 | 7/1995 |
| JP | 59-135960 | 8/1984 |
| JP | 64-60145 | 3/1989 |
| JP | 6-209880 | 8/1994 |
| JP | 8-265407 | 10/1996 |

(Continued)

*Primary Examiner*—CongVan Tran
(74) *Attorney, Agent, or Firm*—Pearne & Gordon LLP (57) ABSTRACT

The invention aims at providing a folding type radio terminal, a call start method and a call start program which allows the user to start a call with a simple operation. On the folding type radio terminal, when a motor driving button is pressed while an incoming signal is being received with a top lid open with respect to a main unit, a controller drives a motor to open the top lid. When a top lid state detector has detected that the top lid is fully open or a predetermined time is measured by the timer from the driving of the motor, the controller 155 shuts down the motor. The controller performs call connection processing in response to the incoming signal so as to place the radio terminal in the call state. This starts a call.

6 Claims, 5 Drawing Sheets

FOREIGN PATENT DOCUMENTS

| | | |
|---|---|---|
| JP | 9-145034 | 6/1997 |
| JP | 11-41648 | 2/1999 |
| JP | 11-122381 | 4/1999 |
| JP | 2000-286959 | 10/2000 |
| JP | 3079820 | 6/2001 |
| JP | 3079820 U | 6/2001 |
| JP | 2001-203786 | 7/2001 |
| JP | 2001-292211 | 10/2001 |
| WO | WO 00/11851 | 3/2000 |
| WO | WO 02/41611 A1 | 5/2002 |

\* cited by examiner

COLLAPSIBLE RADIO TERMINAL, CONVERSION START METHOD AND CONVERSION START PROGRAM

BACKGROUND OF THE INVENTION

1. Field of the Invention

The present invention relates to a folding type radio terminal, a call start method and a call start program which provide the call-ready state with a simple operation.

2. Description of the Related Art

A call by using a folding type portable telephone set is performed usually with unfolding the telephone set. When a call arrives to a folding type portable telephone set, the user unfolds the folding type structure of the telephone set with his/her hands and presses an off-hook button to start calling. The Japanese Patent Laid-Open No. 60145/1989 (U.S. Pat. No. 2,015,664) discloses a portable telephone set which automatically answers an incoming call when its folding type structure is unfolded with the hands of the user. The portable telephone set described in the patent gazette comprises a folding type cabinet, unfolding/folding detecting means for detecting unfolding/folding of the cabinet and call signal detecting means for detecting a call signal. When the cabinet changes from the closed state to open state while a call signal is terminating, the portable telephone set is automatically placed in the call state.

In this way, the related art portable telephone set requires an action of unfolding the cabinet although this action automatically places the portable telephone set in the call state. Unfolding/Folding of the cabinet is usually made with both hands of the user. The user takes time in unfolding the cabinet when one of his/her hands is occupied, which delays the answer. Thus, a folding type portable telephone set which requires only a simple operation to answer an incoming call without using both hands of the user has been in demand.

SUMMARY OF THE INVENTION

The invention has been accomplished in view of the aforementioned related art circumstances and aims at providing a folding type radio terminal, a call start method and a call start program which provide the call-ready state with a simple operation.

In order to solve the problems, a first aspect the invention is a folding type radio terminal having a top lid foldable with respect to a main unit, characterized in that the folding type radio terminal comprises top lid opening/closing means for opening/closing the top lid with respect to the main unit, switch means for starting the operation of the top lid opening/closing means, and control means for controlling the driving of the top lid opening/closing means to control communications connection of the radio terminal in accordance with the open/closed state of the top lid and communications connection state of the radio terminal to control the communications connection of the radio terminal.

A second aspect of the invention is a radio terminal according to the invention, characterized in that, when the switch means is operated while an incoming signal is being received with the top lid open with respect to the main unit, the top lid opening/closing means is driven by way of the driving control by the control means to open the top lid and that the control means responds to the incoming signal to perform call connection processing thus placing the radio terminal in the call state. This provides a radio terminal with good operability and makes it possible to start a call with a simple operation even when the top lid is closed.

A third aspect of the invention is a radio terminal comprising top lid opening/closing detecting means for detecting the open/closed state of the top lid, characterized in that the control means stops the operation of the top lid opening/closing means when the top lid opening/closing means has detected that the top lid has changed from the closed state to the fully open state or from the open state to the fully closed state.

A fourth aspect of the invention is a radio terminal comprising driving time measuring means for measuring the driving time of the top lid opening/closing means, characterized in that the control means stops the operation of the top lid opening/closing means when the time of measurement by the driving time measuring means has reached a predetermined time.

A fifth aspect of the invention is a radio terminal characterized in that the radio terminal is placed in the call state after the top lid opening/closing means is shut down. Thus, unlike a case where call connection processing is performed simultaneously with driving of the top lid opening/closing means, there is no such trouble that a sound of the top lid opening/closing means enters a microphone in the call state or a noise, etc. of the top lid opening/closing means has an adverse effect on the communication state.

A sixth aspect of the invention is a radio terminal, characterized in that, when the switch means is operated while the top lid is open with respect to the main unit and the radio terminal is in the call connection state, the control means releases the call connection and drives the top lid opening/closing means to close the top lid. This allows operation from release of call connection to closing of the top lid only via operation of switch means.

A seventh aspect of the invention is a radio terminal comprising setting storage means in which is set whether the control means automatically performs call connection processing in response to an incoming signal when the switch means is operated while the incoming signal is being received with the top lid closed with respect to the main unit, characterized in that the control means performs the call connection processing in accordance with the setting stored in the setting storage means.

An eighth aspect of the invention is a radio terminal, characterized in that, in case whether to perform the call connection processing is set per registered individual or registered number, or registered group in the setting storage means, the control means determines whether to perform the call connection processing from the setting stored in the setting storage means and the originating number included in the incoming signal, and in case the originating number instructs the call connection processing, the control means performs the call connection processing. In this way, the radio terminal performs call connection processing after the top lid is open or awaits next operation without performing call connection processing. Thus the user of the radio terminal can start a call after checking the caller.

A ninth aspect of the invention is a radio terminal comprising muting means for muting a sound input via a microphone, characterized in that, when the switch means is operated while an incoming signal is being received with the top lid closed with respect to the main unit, the control means performs driving control to drive the top lid opening/closing means to open the top lid and responds to the incoming signal to place the radio terminal in the call state thereby performing call connection processing, and the muting means starts to operate, and that the muting means stops its operation when the top lid is fully open or the driving time of the top lid opening/closing means has reached a predetermined time. In this way, it is possible to operate the muting section to prevent a noise of the top lid opening/closing means from reaching the caller.

A tenth aspect of the invention is a radio terminal, characterized in that, when the switch means is operated while the top lid is closed with respect to the main unit and the radio terminal is not in the communications connection state, the control means performs driving control to drive the top lid opening/closing means to open the top lid.

An eleventh aspect of the invention is a radio terminal comprising a hinge section for coupling the main unit and the top lid so as to allow the top lid to rotate with respect to the main unit, characterized in that the switch means is arranged in close proximity of the hinge section on the side of the main unit. Thus the user of the radio terminal can readily operate the switch means with the radio terminal in his/her hands.

A twelfth aspect of the invention is a radio terminal characterized in that the top lid opening/closing means is provided in the hinge section.

A thirteenth aspect of the invention is a call start method using the folding type radio terminal, comprising top lid opening/closing means for opening/closing the top lid with respect to the main unit and switch means for starting the operation of the top lid opening/closing means, characterized in that, when the switch means is operated while an incoming signal is being received with the top lid closed with respect to the main unit, the method drives the top lid opening/closing means to open the top lid and performs call connection processing to place the radio terminal in the call state in response to the incoming signal.

A fourteenth aspect of the invention is a call start program which uses a computer as control means included in a radio terminal according to any one of the first through tenth aspects of the invention.

In the figures, numerals 100, 200 and 300 represent radio terminals, a numeral 001 represents a main unit, 103 a top lid, 105 a hinge section, 111 a motor, 113 an off-hook button, 115 an on-hook button, 119 a microphone, 121 a motor driving button, 123 a display, 125 a speaker, 151 an antenna, 153 a radio section, 155 a controller, 117 an operation button, 157 a top lid state detector, 159 a timer, 201 a setting storage section, and 301 a muting section.

DETAILED DESCRIPTION OF THE PREFERRED EMBODIMENTS

The radio terminal described below is a folding type radio terminal which performs call connection processing so that, when a motor driving button is pressed while an incoming signal is being received with the top lid open with respect to a main unit, a motor drives the top lid to open, thus placing the radio terminal in the call state in response to the incoming signal. Embodiments of the radio terminal according to the invention will be described in detail referring to the drawings. While a radio terminal and a call start method using this radio terminal according to the invention are described in detail in the following description of the embodiments, a call start program is a program for executing the call start method so that the corresponding description is included in the following description of the call start method.

Figure 1:
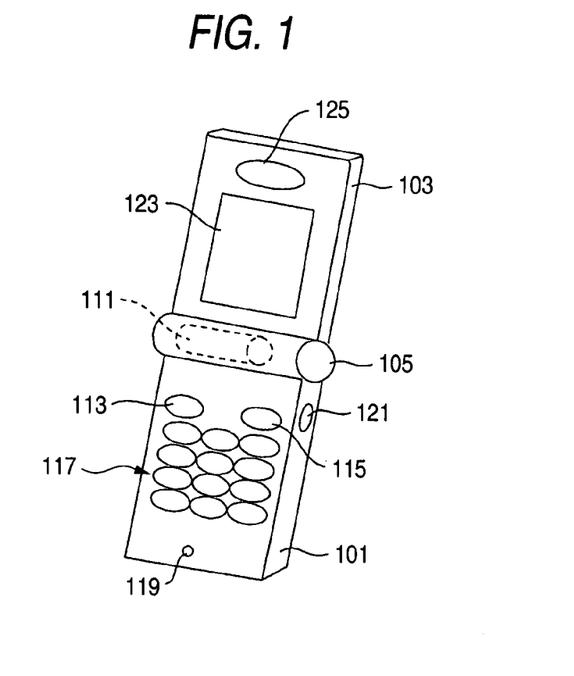
FIG. 1 is an external view of a radio terminal according to an embodiment of the invention.

FIG. 1 is an external view of a radio terminal according to an embodiment of the invention. In FIG. 1, the radio terminal of this embodiment is a folding type cell phone or PHS comprising a main unit 101, a top lid 103, and a hinge section which couples the main unit 101 and the top lid 103 so that the top lid 103 can rotate with respect to the main unit 101. In the hinge section 105 is provided a motor 111 for opening/closing the top lid 103. On the main unit 101 are provided a main unit operation button 117 and a microphone 119. In particular, on one of the right and left sides in the near proximity of the hinge section 105 is provided a motor driving button 121 for driving the motor 111. On the top lid 103 are provided a display 123 and a speaker 125.

First Embodiment

Figure 2:
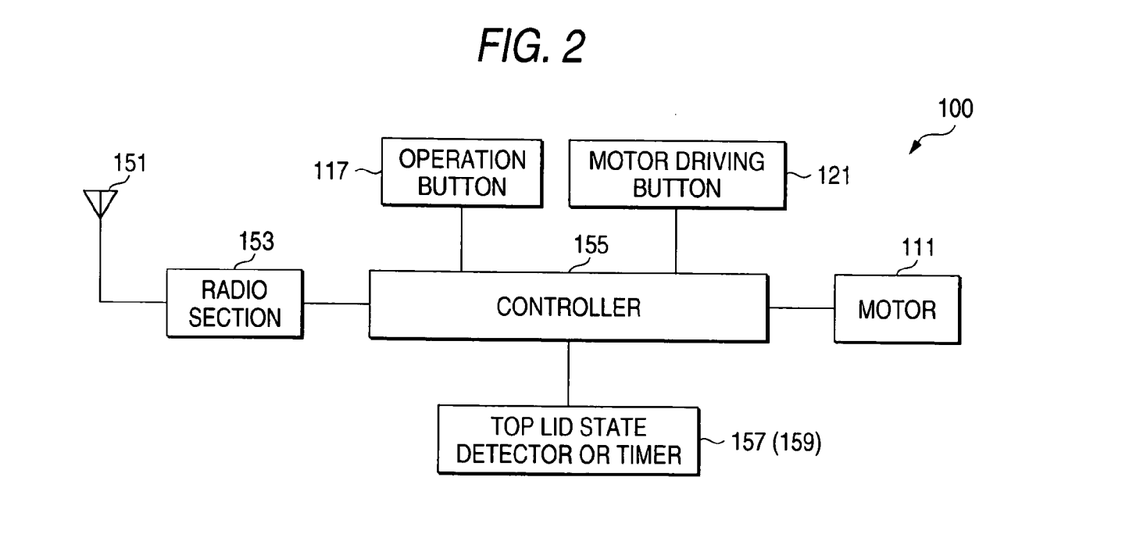
FIG. 2 is a block diagram showing the internal configuration of the radio terminal according to the first embodiment.

FIG. 2 is a block diagram showing the internal configuration of a radio terminal according to the first embodiment. In FIG. 2, sections same as those in FIG. 1 (external view of the radio terminal) are assigned the same numerals/signs. As shown in FIG. 2, the radio terminal 100 of the first embodiment comprises an antenna 151, a radio section 153, a controller 155 corresponding to the control means according to the invention, a motor 111 corresponding to the top lid opening/closing means, a motor driving button 121 corresponding to corresponding to switch means, an operation button 117, and a top lid state detector 157 corresponding to the top lid open/closed state detecting means.

The components of the radio terminal 100 shown in FIG. 2 will be described. The motor 111, the motor driving button 121 and the operation button 117 are described above and the corresponding description is omitted. The antenna 151 transmits/receives a radio signal. The radio section 153 performs modulation/demodulation, etc. of the radio signal. The controller 155 controls the components of the radio terminal 100 and processes the information obtained from the components. For example, the controller 155 recognizes that the motor driving button 121 or the operation button 117 has been pressed, controls the driving of the motor 111, recognizes the detection result of the top lid state detector 157, and controls the operation of the radio section 153. The top lid state detector 157 detects the open/closed state of the top lid section 103, and in particular, detects whether the top lid 103 is fully open or closed with respect to the main unit 101.

The controller 155 shuts down the motor 111 being driven when the top lid state detector 157 has detected that the top lid has changed from the closed state to the fully open state or from the open state to the fully closed state. A timer corresponding to the driving time measuring means according to the invention for measuring the driving time of the motor 111 may be provided instead of the top lid state detector 157. In this practice, the controller 155 shuts down the motor 111 when a predetermined time is measured by the timer 159 after the motor 111 is driven. Note that the predetermined time is a previously measured time from when the motor 111 starts to be driven to when the top lid reaches the fully open or fully closed state.

Figure 3:
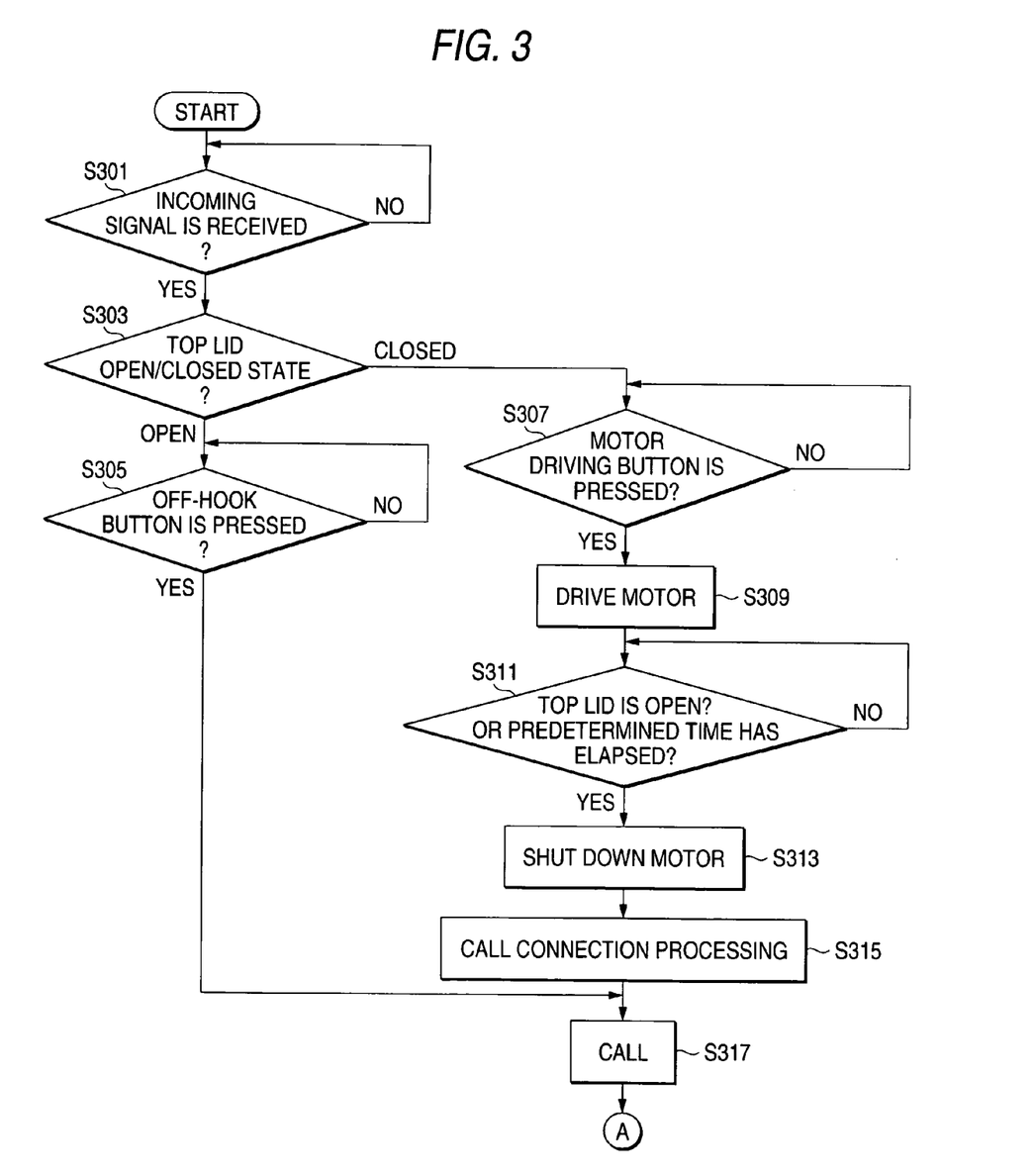
FIG. 3 is a flowchart explaining a call start method using the radio terminal according to the first embodiment.
Figure 4:
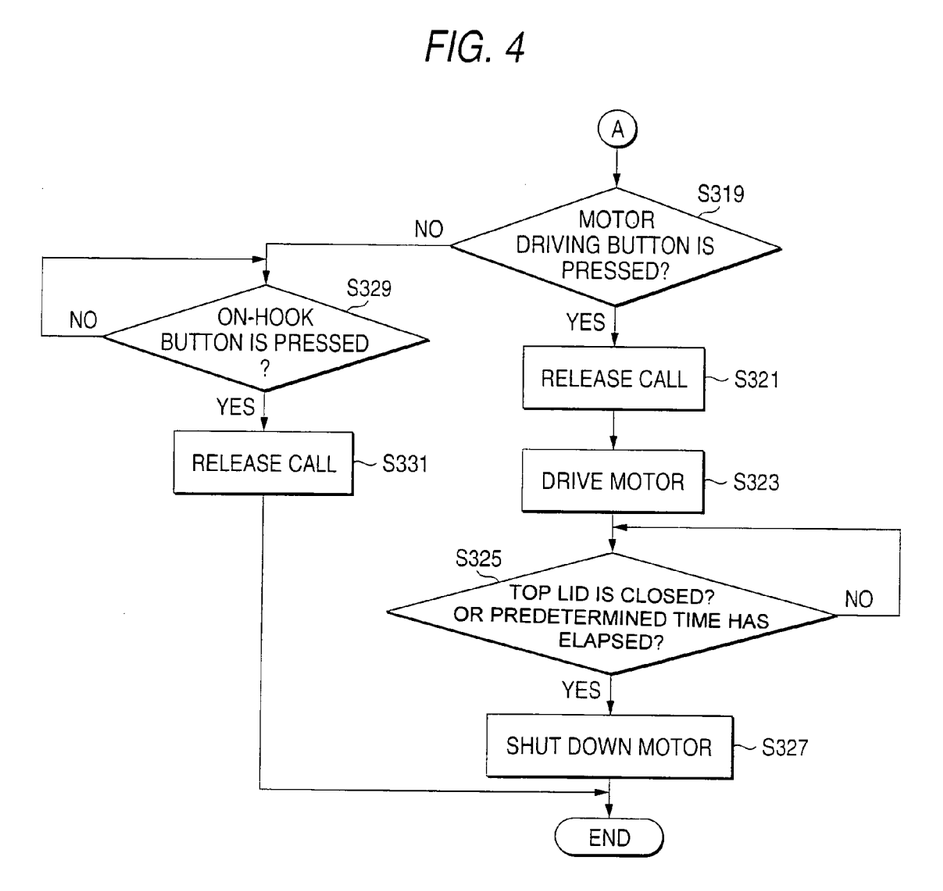
FIG. 4 is a flowchart explaining the call start method using the radio terminal according to the first embodiment.

Next, the call start method using the folding type radio terminal according to this embodiment will be described referring to FIGS. 3 and 4. FIGS. 3 and 4 are flowcharts explaining the call start method using the radio terminal according to the first embodiment.

In step S301, when the controller 155 recognizes that the radio terminal 100 has received an incoming signal, execution proceeds to step S303 to determine whether the top lid is open or closed. When it is determined that the top lid is open in step S303 and the off-hook button 113 is pressed in step 305, the radio terminal 100 is placed in the call state as shown in step S317. When it is determined that the top lid is closed in step S303 and the motor driving button 121 is pressed in step 307, the controller 155 drives the motor 111 to open the to p lid 103.

When the top lid state detector 157 has detected that the top lid 103 is open or a predetermined time is measured by the timer 159 in step S311, the controller 155 shuts down the motor 111 in step S313. In step S315, the controller 155 performs call connection processing in response to the incoming signal. This places the radio terminal 100 in the call state as shown in step S317.

Next, when the motor driving button 121 is pressed in step S319 shown in FIG. 4 while the radio terminal 100 is in the call state, the call in which the radio terminal 100 is engaged is released as shown in step S321. When the call is released, the controller 155 drives the motor 111 to close the top lid 103. When the top lid state detector 157 has detected that the top lid 103 is closed or a predetermined time is measured by the timer 159 in step S325, the controller 155 shuts down the motor 111 in step S327. When the motor driving button 121 is not pressed in step S319 and the on-hook button 115 is pressed in step S329, the call in which the radio terminal 100 is engaged is released as shown in step S331.

In this way, in order to start a call in response to an incoming signal, the user has only to press the motor driving button 121 while the top lid 103 is closed. This causes the motor 111 to open the top lid 103, followed by automatic call connection processing which allows a call. While the top lid 103 is open, pressing the off-hook button starts a call. To hang up, the user presses the motor driving button 121. This releases the call and causes the motor 111 to automatically close the top lid 103. To hang up without closing the top lid 103, the user presses the on-hook button 115.

To originate a call using the radio terminal according to this embodiment, the user presses the motor driving button 121. This causes the controller 155 to drive the motor 111 and open the top lid 103. The user selects a called party and presses the off-hook button 113 to ring the called party.

As described hereinabove, according to the radio terminal 100 and the call start method of this embodiment, when the motor driving, button 121 is pressed while an incoming signal is being received with the top lid 103 closed, the top lid 103 is opened by the motor 111 followed by automatic call connection processing. The user of the radio terminal 100 has only to press the driving button 121 to start a call even in case the top lid is closed. This allows the user to readily answer an incoming call even when one of his/her hands is occupied. As a result, it is possible to provide a radio terminal featuring excellent operability.

Call connection processing is performed after the motor 111 is shut down. Thus, unlike a case where call connection processing is performed simultaneously with driving of the top lid opening/closing means, there is no such trouble that a sound of the top lid opening/closing means enters a microphone in the call state or a noise, etc. of the top lid opening/closing means has an adverse effect on the communication state.

The motor driving button 121 is provided on one of the right and left sides in the near proximity of the hinge section 105 on the main unit 101. Thus the user of the radio terminal 100 can readily press the motor driving button 121 with the radio terminal in his/her hand.

Second Embodiment

Figure 5:
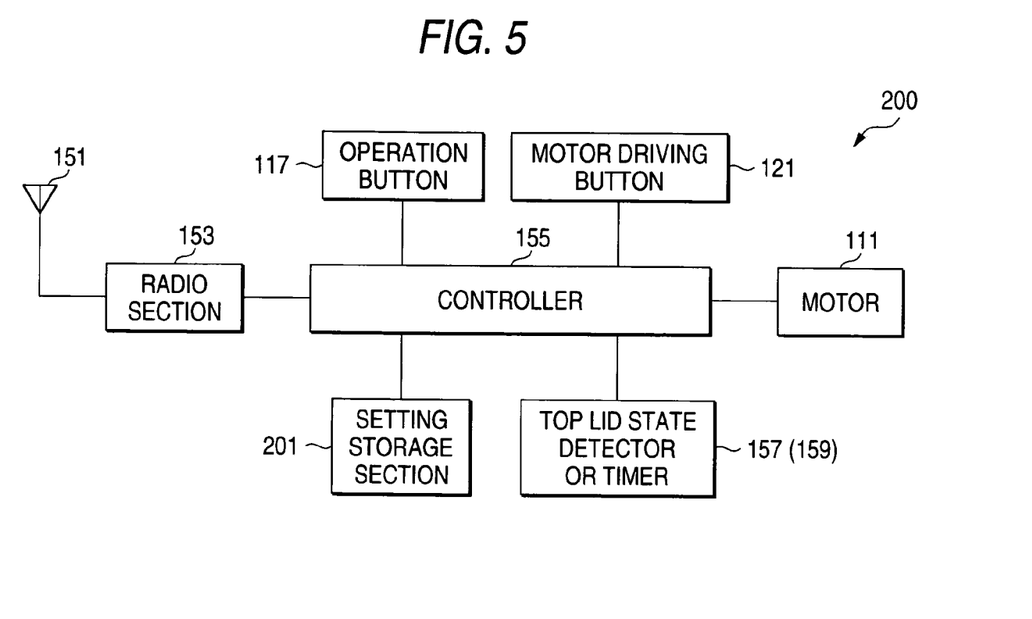
FIG. 5 is a block diagram showing the internal configuration of a radio terminal according to the second embodiment.

FIG. 5 is a block diagram showing the internal configuration of a radio terminal according to the second embodiment. In FIG. 5, sections same as those in FIG. 2 (internal configuration of the radio terminal according to the first embodiment) are assigned the same numerals/signs and the corresponding description is omitted. As shown in FIG. 5, a radio terminal 200 according to the second embodiment comprises a setting storage section 201 corresponding to the setting storage means according to the invention, on top of the components of the radio terminal 100 according to the first embodiment. The setting storage section 201 stores the setting such as on whether to perform call connection processing in response to an incoming signal received by the antenna 151 or similar setting registered per individual or directory number, or group. Setting of data is made by using the operation button 117.

A call start method using the radio terminal 200 according to this embodiment comprises a step of checking the setting stored in the setting storage section 201 before starting step S315 in the flowchart shown in FIG. 3. For example, when setting is made not to automatically perform call connection processing, the controller 155 skips step S315 in accordance with this setting but awaits the next operation while an incoming signal is being received with the top lid 103 open.

When setting is made on whether call connection processing is automatically performed or not automatically performed per individual or directory number, or group, the controller 155 executes step S315 in case the originating number included in the incoming signal instructs automatic call connection processing. Otherwise the controller 155 skips step S315 setting but awaits the next operation while an incoming signal is being received with the top lid 103 open.

When the user of the radio terminal 200 presses the off-hook button 113 after checking the originating number or caller corresponding to the originating number, the controller 155 performs the call connection processing similar to step S315 to start a call.

As described hereinabove, according to the radio terminal 200 and the call start method of this embodiment, the radio terminal 200 performs the call connection processing after the top lid 103 is open or awaits next operation without performing this processing depending on the registered setting. Thus the user of the radio terminal 200 can check the caller and start a call.

Third Embodiment

Figure 6:
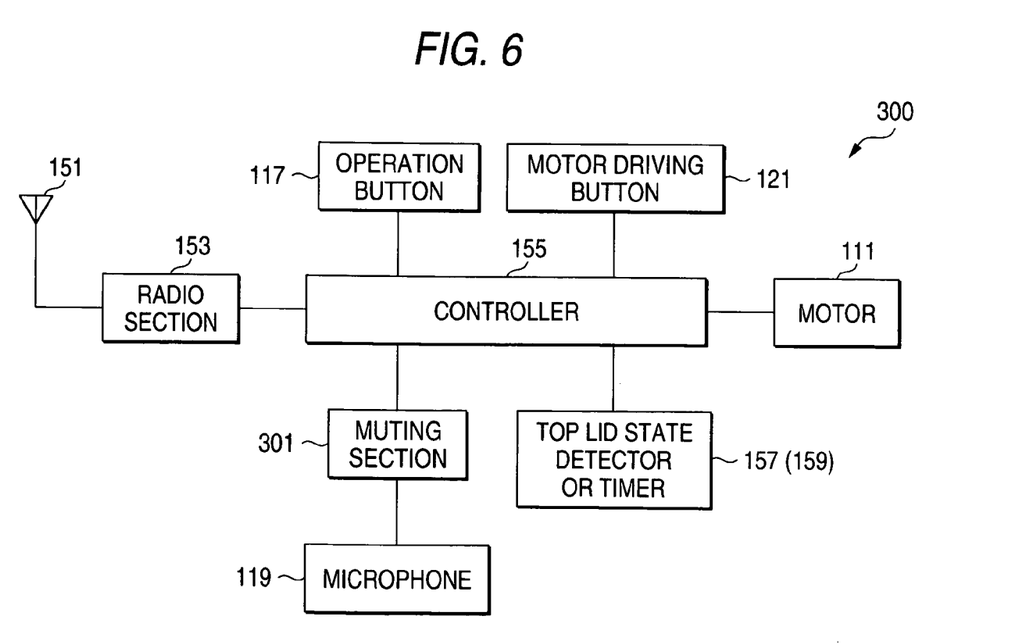
FIG. 6 is a block diagram showing the internal configuration of a radio terminal according to the third embodiment.

FIG. 6 is a block diagram showing the internal configuration of a radio terminal according to the third embodiment. In FIG. 6, sections same as those in FIG. 2 (internal configuration of the radio terminal according to the first embodiment) are assigned the same numerals/signs and the corresponding description is omitted. As shown in FIG. 6, a radio terminal 300 according to the third embodiment comprises a muting section 301 corresponding to the muting means according to the invention, on top of the components of the radio terminal 100 according to the first embodiment. The muting section 301 mutes a sound input via the microphone 119.

In this embodiment, call connection processing is performed approximately at the same time as the driving of the motor 111 when the motor driving button 121 is pressed, unlike the case of the first embodiment where call connection processing is performed after the motor 111 is shut down. When a call is started by the call connection processing, a noise of the motor 111 enters the microphone 119. The muting section 301 is operated while the motor 111 is being driven in order to suppress the noise.

Figure 7:
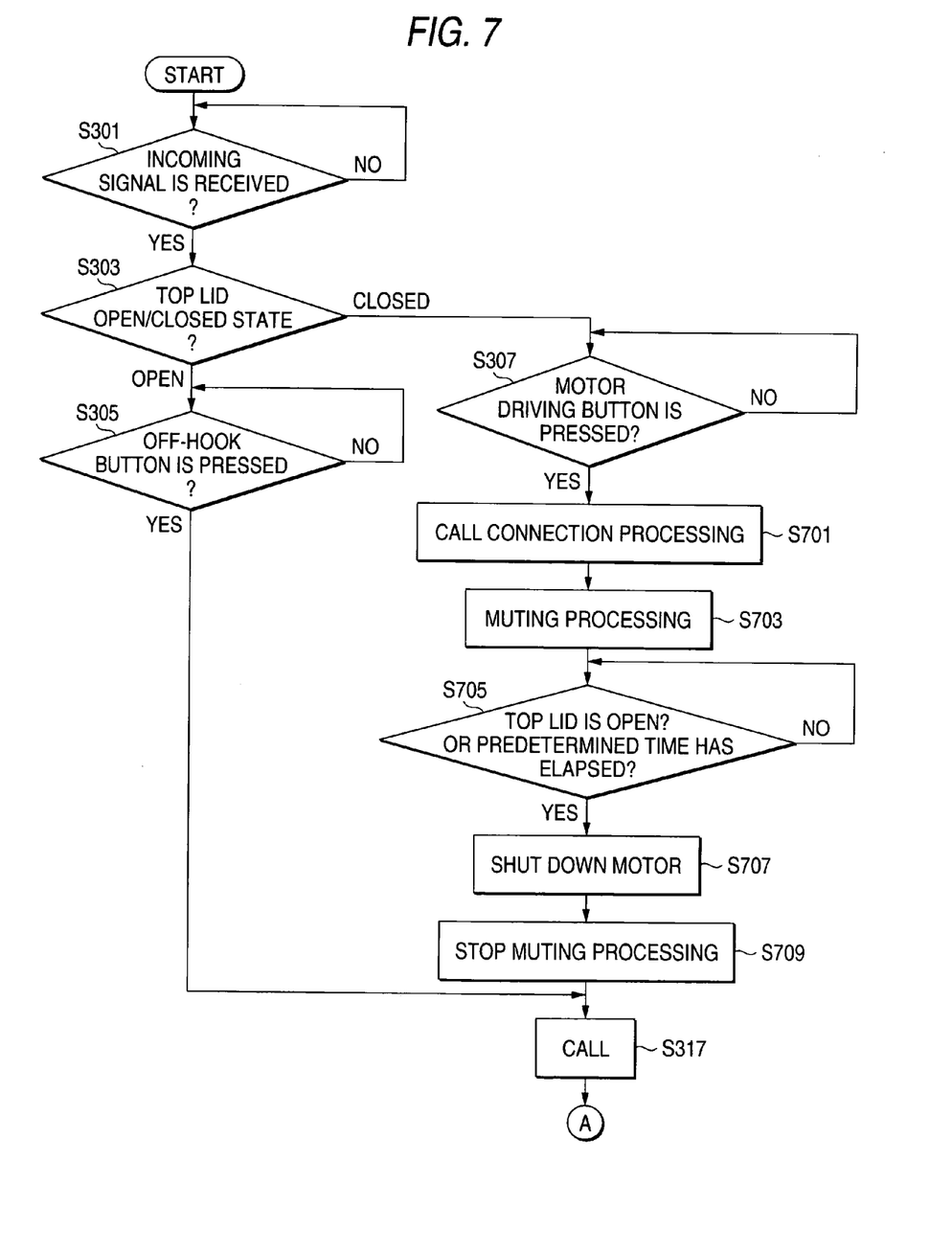
FIG. 7 is a flowchart explaining a call start method using the radio terminal according to the third embodiment.

FIG. 7 is a flowchart explaining a call start method using the radio terminal according to the third embodiment. Steps S301 through S309 and steps S317 through S331 in FIGS. 3 and 4 of the first embodiment are the same as those in the flow of this embodiment, so that the corresponding description is omitted.

As shown in FIG. 7, in a call start method according to this embodiment, when the motor driving button 121 is pressed (step S307) to drive the motor 111 (step S309), the controller performs call connection processing in step S701 and operates the muting section 301 as shown in step S703. Next, when the top lid state detector 157 has detected that the top lid 103 is open or a predetermined time is measured by the timer 159 in step S705, the controller 155 shuts down the motor 111 as shown in step S707. When the controller stops the operation of the muting section 301 in step S709, the user can start a call using the radio terminal 300.

As described hereinabove, according to the radio terminal 300 and the call start method of this embodiment, the controller 155 performs call connection processing approximately at the same time as it activates the motor 111 when the motor driving button 121 is pressed. The muting section 301 is operated to prevent the sound of the motor from reaching the caller.

While the opening/closing operation of the top lid 103 is performed by the motor 111 in the first through third embodiments, the opening/closing operation may be performed manually as in the related art. Another function may be assigned to the motor driving button 121 to use the motor driving button 121 for example as a power button, like the on-hook button 115.

While the invention has been described details and in terms of its specific embodiments, those skilled in the art will recognize that various changes and modifications can be made in it without departing from the spirit and scope thereof.

This application is based on the Japanese Patent Application filed Sep. 6, 2001 (Japanese Patent Application No. 2001-270467), the disclosure of which is incorporated herein by reference.

INDUSTRIAL APPLICABILITY

As described hereinabove, a folding type radio terminal, a call start method and a call start program allow the user to start a call with a simple operation even when the top lid of the radio terminal is closed.

What is claimed is:

1. A folding type radio terminal having a top lid foldable with respect to a main unit, said folding type radio terminal comprising:

top lid opening/closing means for opening and closing said top lid with respect to said main unit;

switch means for starting an opening and closing operation of said top lid opening/closing means;

control means for controlling driving of said top lid opening/closing means in accordance with an opening/closing state of said top lid and controlling communications connections of said radio terminal in accordance with a communications connection state of said radio terminal; and muting means for muting a sound input via a microphone;

wherein, when said switch means is operated while an incoming signal is being received with said top lid closed with respect to said main unit, said control means performs driving control to drive said top lid opening/closing means to open said top lid and responds to said incoming signal to place the radio terminal in a call connection state thereby performing call connection processing, and said muting means starts to operate, and wherein said muting means stops operation of muting when said top lid is fully open or the driving time of said top lid opening/closing means has reached a predetermined time.

2. The radio terminal according to claim 1, further comprising:

setting storage means for setting whether said control means automatically performs call connection processing in response to an incoming signal;

wherein, when said switch means is operated while said incoming signal is being received with said top lid closed with respect to said main unit, said control means performs said call connection processing in accordance with the setting stored in said setting storage means.

3. The radio terminal according to claim 2, wherein, in case whether to perform said call connection processing is set per registered individual or registered number, or registered group in said setting storage means, said control means determines whether to perform said call connection processing from the setting stored in said setting storage means and the originating number included in said incoming signal, and wherein, in case said originating number instructs said call connection processing, said control means performs said call connection processing.

4. The radio terminal according to any one of the claims 1, 2, and 3, further comprising:

a hinge section for coupling said main unit and said top lid so as to allow said top lid to rotate with respect to said main unit;

wherein said switch means is arranged in close proximity of the hinge section on the side of said main unit.

5. The radio terminal according to claim 4, wherein said top lid opening/closing means is provided in said hinge section.

6. A call start program utilized in a computer as control means provided in a radio terminal according to any one of claims 1, 2, and 3.

* * * * *

UNITED STATES PATENT AND TRADEMARK OFFICE
CERTIFICATE OF CORRECTION

| | |
|---|---|
| PATENT NO. | : 7,089,044 B2 |
| APPLICATION NO. | : 10/451713 |
| DATED | : August 8, 2006 |
| INVENTOR(S) | : Akinori Ohta |

It is certified that error appears in the above-identified patent and that said Letters Patent is hereby corrected as shown below:

On Title Page, under [56] "FOREIGN PATENT DOCUMENTS", please delete "64-60145 and insert - -64-80145- -.

Signed and Sealed this

Twenty-eighth Day of November, 2006

JON W. DUDAS
*Director of the United States Patent and Trademark Office*